(12) United States Patent
Nix et al.

(10) Patent No.: US 11,285,965 B2
(45) Date of Patent: Mar. 29, 2022

(54) AUTONOMOUS VEHICLE INTERFACE SYSTEM WITH MULTIPLE INTERFACE DEVICES FEATURING REDUNDANT VEHICLE COMMANDS

(71) Applicant: UATC, LLC, San Francisco, CA (US)

(72) Inventors: Molly Castle Nix, San Francisco, CA (US); Sean Chin, Pittsburgh, PA (US); Dennis Zhao, Pittsburgh, PA (US); Eric James Hanson, San Francisco, CA (US)

(73) Assignee: UATC, LLC, Mountain View, CA (US)

( * ) Notice: Subject to any disclaimer, the term of this patent is extended or adjusted under 35 U.S.C. 154(b) by 534 days.

(21) Appl. No.: 15/901,424

(22) Filed: Feb. 21, 2018

(65) Prior Publication Data
US 2019/0248378 A1    Aug. 15, 2019

Related U.S. Application Data

(60) Provisional application No. 62/629,142, filed on Feb. 12, 2018.

(51) Int. Cl.
*B60W 50/10* (2012.01)
*B60K 35/00* (2006.01)
*G05D 1/00* (2006.01)

(52) U.S. Cl.
CPC .......... *B60W 50/10* (2013.01); *B60K 35/00* (2013.01); *G05D 1/0016* (2013.01); *G05D 1/0088* (2013.01); *B60K 2370/11* (2019.05); *B60W 2540/215* (2020.02); *G05D 2201/0213* (2013.01)

(58) Field of Classification Search
USPC ......................................................... 701/23
See application file for complete search history.

(56) References Cited

U.S. PATENT DOCUMENTS

| | | | | |
|---|---|---|---|---|
| 2008/0262669 | A1* | 10/2008 | Smid | G05D 1/0278 701/23 |
| 2015/0338852 | A1* | 11/2015 | Ramanujam | G08G 1/202 701/2 |
| 2016/0322044 | A1* | 11/2016 | Jung | H04L 67/12 |

(Continued)

*Primary Examiner* — Tyler D Paige
(74) *Attorney, Agent, or Firm* — Dority & Manning, P.A.

(57) ABSTRACT

The present disclosure provides an autonomous vehicle and associated interface system that includes multiple vehicle interface computing devices that provide redundant vehicle commands. As one example, an autonomous vehicle interface system can include a first vehicle interface computing device located within the autonomous vehicle and physically coupled to the autonomous vehicle. The first vehicle interface computing device can provide a first plurality of selectable vehicle commands to a human passenger of the autonomous vehicle. The autonomous vehicle interface system can further include a second vehicle interface computing device that provides a second plurality of selectable vehicle commands to the human passenger. For example, the second vehicle interface computing device can be the passenger's own device (e.g., smartphone). The second plurality of selectable vehicle commands can include at least some of the same vehicle commands as the first plurality of selectable vehicle commands.

20 Claims, 6 Drawing Sheets

(56) References Cited

U.S. PATENT DOCUMENTS

| | | | |
|---|---|---|---|
| 2018/0068505 A1* | 3/2018 | Mullett | G05D 1/0022 |
| 2018/0224844 A1* | 8/2018 | Zhang | G05D 1/0011 |
| 2018/0237027 A1* | 8/2018 | Lundsgaard | G06Q 40/08 |
| 2018/0322775 A1* | 11/2018 | Chase | G06N 5/003 |
| 2018/0326997 A1* | 11/2018 | Sweeney | G01C 21/3617 |
| 2018/0335783 A1* | 11/2018 | Sweeney | B60W 60/005 |
| 2019/0238638 A1* | 8/2019 | Way | G05D 1/0088 |
| 2019/0248378 A1* | 8/2019 | Nix | G05D 1/0077 |
| 2019/0299933 A1* | 10/2019 | Suzuki | G05D 1/0088 |
| 2020/0051194 A1* | 2/2020 | Park | G05D 1/0212 |

* cited by examiner

AUTONOMOUS VEHICLE INTERFACE SYSTEM WITH MULTIPLE INTERFACE DEVICES FEATURING REDUNDANT VEHICLE COMMANDS

PRIORITY CLAIM

This application claims priority to and the benefit of U.S. Provisional Patent Application No. 62/629,142, filed Feb. 12, 2018. U.S. Provisional Patent Application No. 62/629,142 is hereby incorporated herein by reference in its entirety.

FIELD

The present disclosure relates generally to autonomous vehicles. More particularly, the present disclosure relates to autonomous vehicle interface systems which feature multiple interface devices with redundant vehicle commands.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computing system for enabling interaction between a human passenger and an autonomous vehicle. The computing system includes a first vehicle interface computing device located within the autonomous vehicle and physically coupled to the autonomous vehicle. The first vehicle interface computing device provides a first plurality of selectable vehicle commands to the human passenger. At least some of the plurality of selectable vehicle commands are also included in a second plurality of selectable vehicle commands that are provided by a second vehicle interface computing device that is portable.

Another example aspect of the present disclosure is directed to a computer-implemented method. The method includes receiving, by a computing system comprising one or more computing devices, data indicating that a human passenger selected a first vehicle command at a first vehicle interface computing device. The first vehicle command was redundantly provided for selection on both the first vehicle interface computing device and a second vehicle interface computing device. Both the first vehicle interface computing device and the second vehicle interface computing device are physically located within an autonomous vehicle. The method includes, in response to receipt of the data, causing, by the computing system, the second vehicle interface computing device to communicate a message that indicates that the first vehicle command was selected.

Another example aspect of the present disclosure is directed to an autonomous vehicle. The autonomous vehicle includes an in-vehicle interface computing device located in a cabin of the autonomous vehicle and physically coupled to the autonomous vehicle. The in-vehicle interface computing device is configured to provide a first plurality of selectable vehicle commands. The in-vehicle interface computing device is configured to receive data indicating that a passenger selected one of the first plurality of selectable vehicle commands at a hand held user computing device. The in-vehicle interface computing device is configured to, in response to receipt of the data, communicate a message that indicates that the first vehicle command was selected.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Example aspects of the present disclosure are directed to an autonomous vehicle and associated interface system that includes multiple vehicle interface computing devices that provide redundant vehicle commands. As one example, an autonomous vehicle interface system can include a first vehicle interface computing device located within the autonomous vehicle and physically coupled to the autonomous vehicle. The first vehicle interface computing device can provide a first plurality of selectable vehicle commands to a human passenger of the autonomous vehicle. For example, the first vehicle interface computing device can be or include a display screen or tablet computing device that is physically coupled to (e.g., embedded in) the autonomous vehicle. According to an aspect of the present disclosure, the autonomous vehicle interface system can further include a second vehicle interface computing device that provides a second plurality of selectable vehicle commands to the human passenger. For example, the second vehicle interface computing device can be the passenger's own device (e.g., smartphone) that joins the interface computing system for the autonomous vehicle when the passenger is paired or otherwise associated with the autonomous vehicle (e.g., in response to a trip request input via a ride sharing application).

In particular, according to another aspect of the present disclosure, the second plurality of selectable vehicle commands can include at least some of the same vehicle commands as the first plurality of selectable vehicle commands. That is, the first vehicle interface computing device and the second vehicle interface computing device can provide redundant vehicle commands for selection by the passenger. Thus, in some implementations, for some or all of the controls provided by the first vehicle interface computing device, these same controls can also additionally be available via the second vehicle interface computing device.

By providing redundant vehicle commands across multiple vehicle interface computing devices, the passenger can be enabled to interface with the autonomous vehicle using the device that is most convenient or accessible (e.g., disability accessible) for the passenger. Furthermore, use of multiple, redundant interface computing devices eliminates the risk of a single point of failure, making the interface system resilient against failure of one of the vehicle interface computing devices. In addition, de-duplication can be performed to resolve commands which are received across multiple interface system access points/interface devices. The multiple access points can be synthesized for control of a single autonomous vehicle and/or reflective of a real-time trip status.

Thus, the first vehicle interface computing device and the second vehicle interface computing device can provide redundant vehicle commands for selection by the passenger. As one example, both of the first and the second interface computing devices can provide a start trip command. For example, the start trip command can instruct the autonomous vehicle to begin traversing a trip from a pick up location to a drop off location. For example, the start trip command can be made available on the interface devices when the passenger is in the vehicle, buckled her seatbelt, etc. As another example, both of the first and the second interface computing devices can provide a request vehicle pull over command for selection by the passenger. For example, the request vehicle pull over command can instruct the autonomous vehicle to pull over (e.g., immediately within the current lane of the autonomous vehicle, to a nearest safe place such as a road shoulder or median, and/or to a nearest designated drop-off zone). For example, the request vehicle pull over command can be used to end a trip prematurely (e.g., before an originally-planned destination is reached). In another example, the request vehicle pull over command can be used in an emergency situation in which the user wishes the vehicle to come to a stop for some reason. As yet another example, both of the first and the second interface computing devices can provide a contact support command. For example, the contact support command can result in a remote support service being contacted (e.g., by the autonomous vehicle or by one of the vehicle interface devices via a network interface of the autonomous vehicle). In one example, the contact support command can result in a remote tele-assist service being contacted, where the remote tele-assist service can remotely control motion of the autonomous vehicle to resolve some situation (e.g., autonomous vehicle malfunction). As another example, both of the first and the second interface computing devices can provide a route selection vehicle command for selection or interaction by the passenger. For example, the route selection vehicle command can control a route that the autonomous vehicle will take or traverse. The route selection vehicle command can include selection of one of a number of displayed possible routes and/or can include entry (e.g., via touch, typing, voice etc.) by the passenger of identification of a particular route to take (e.g., "take the 99 tunnel" or "stop by my dad's first"). As yet further examples, both of the first and the second interface computing devices can provide various vehicle commands that enable the passenger to control various cabin conditions such as, for example, cabin temperature(s), fan blower speed, lighting levels, audio levels (e.g., radio, announcements, etc.), and/or other forms of cabin controls.

As one example, the first vehicle interface computing device can be or include a tablet computing device or other form of display screen that is located and secured within a passenger area (e.g., rear seat or passenger seat) of the autonomous vehicle. In some instances, the first vehicle interface computing device can be referred to as an "in-vehicle screen." In some implementations, the first vehicle interface computing device can be embedded in a dashboard of the autonomous vehicle.

In some implementations, the second vehicle interface computing device can be portable. For example, in some implementations, the second vehicle interface computing device can be a hand held device. For example, the second vehicle interface computing device can be freely movable (e.g., not physically coupled to the autonomous vehicle in any way).

According to an aspect of the present disclosure, in some implementations, the second vehicle interface computing device can be a user computing device that is associated with (e.g., owned by or otherwise specific to) the passenger. For example, the second vehicle interface computing device can be a smartphone associated with the user. Thus, in one example, the second vehicle interface computing device can be the device through which the passenger requested the trip with the autonomous vehicle (e.g., using a ride sharing application installed on the device).

In another example, the second vehicle interface computing device can be a disability-enabled device designed for use by disabled passengers. For example, the second vehicle interface computing device can provide specialized outputs/controls which are more easily usable by visually-impaired persons.

Thus, in various implementations, the first vehicle interface computing device and/or the second vehicle interface computing device can include a display screen. The vehicle interface computing device(s) can display the selectable vehicle commands on their respective display screens. For example, the vehicle interface computing device(s) can display the selectable vehicle commands (e.g., as selectable buttons, icons, etc.) within a graphical user interface. In one example, the display screen can be a touch-sensitive display screen and the passenger can select one of the selectable vehicle commands by touching the display screen at a location where the command is displayed.

Furthermore, in some implementations, in addition to the first and the second vehicle interface computing devices, the autonomous vehicle can further include one or more additional hardware components. For example, the hardware components can be located within the autonomous vehicle and physically coupled to the autonomous vehicle (e.g., in the same general area as the first vehicle interface computing device). In particular, the one or more hardware components can enable entry by the human passenger of one or more of the first and/or the second plurality of selectable vehicle commands (e.g., "pull vehicle over command"). As examples, the one or more hardware components can include buttons, levers, knobs, etc. that enable the user to enter or otherwise select certain vehicle commands. Thus, the one or more hardware components can provide yet another access point for redundant vehicle commands which are also provided by the first and/or the second vehicle interface computing device.

According to another aspect of the present disclosure, in implementations in which the second vehicle interface computing device is associated with the passenger (e.g., is a user computing device such as a smartphone as described above), the second vehicle interface computing device can provide at least some of the second plurality of selectable vehicle commands for selection by the human passenger prior to entry into the autonomous vehicle by the human passenger and/or subsequent to exit of the autonomous vehicle by the human passenger. Thus, the passenger can be provided with vehicle controls before and/or after entering and/or exiting the vehicle.

In some implementations, the autonomous vehicle interface system can further include a server computing system. The server computing system can communicatively connect to the first vehicle interface computing device and/or the second vehicle interface computing device via a wide area network (e.g., a cellular network, the Internet, etc.). In some implementations, the server computing system can be configured to receive data from the first vehicle interface computing device and/or the second vehicle interface computing device indicating that the passenger has selected one of the selectable vehicle commands. The server computing system can effectuate or otherwise appropriately respond to the vehicle command. For example, the server computing system can communicate (e.g., over the wide area network) with the autonomous vehicle to relay the selected vehicle command and cause the autonomous vehicle to effectuate the vehicle command. In other implementations, however, the first vehicle interface computing device and/or the second vehicle interface computing device can communicate directly with the autonomous vehicle (e.g., using a wired connection and/or a wireless connection such as, for example, a short range wireless communication connection) to convey the selected vehicle command.

According to another aspect of the present disclosure, in some implementations, the server computing system can be configured to resolve conflicting commands respectively received from the first vehicle interface computing device and the second vehicle interface computing device based on respective times of receipt for the conflicting commands at the server computing system. Thus, the server computing system can effectuate whichever command was received first by the server computing system and can disregard the later-received command.

According to another aspect of the present disclosure, the interface system can provide consistent messaging and command response across all interface computing devices or other access points included in the autonomous vehicle interface system. Providing consistent messaging across all touch points can reduce or eliminate passenger confusion about which device they are supposed to interact with, whether their selected command has been received, and/or whether a particular device is a primary device or a secondary device.

More particularly, in some implementations, if the passenger selects a particular vehicle command (e.g., start trip command) at one of the first vehicle interface computing device or the second interface computing device, then in response, the other of the first vehicle interface computing device or the second interface computing device can display a message or graphic that indicates that the particular vehicle command (e.g., start trip command) was selected (e.g., in addition to communication of such a message or graphic at the device with which the passenger interacted). To provide an example, in response to selection of the start trip command at the first vehicle interface computing device, both the first vehicle interface computing device and the second vehicle interface computing device can display (e.g., simultaneously display) or otherwise communicate a message or other graphic indicating that the trip is being started.

The vehicle interface computing device(s) can communicate with each other according to a number of different network arrangements. As one example, the first vehicle interface computing device can receive a user input that selects a particular vehicle command. In response, the first vehicle interface computing device can transmit data to the server computing system indicating that the passenger selected the particular vehicle command. In response, the server computing system can cause the second vehicle interface computing device (e.g., by sending data or instructions over the network) to display or otherwise communicate a message or other graphic that indicates that the first vehicle command was selected.

In another example, the first vehicle interface computing device can receive a user input that selects a particular vehicle command. In response, the first vehicle interface computing device can transmit data to the second vehicle interface computing device indicating that the passenger selected the particular vehicle command. In response, the second vehicle interface computing device can display or otherwise communicate a message or other graphic that indicates that the first vehicle command was selected. For example, in some implementations, the first vehicle interface computing device and the second vehicle interface computing device can directly communicate with each other via one or more short-range wireless techniques such as, for example, Bluetooth, near field communication (NFC), ZigBee, infrared communication, etc. In other implementations, the first vehicle interface computing device and the second vehicle interface computing device can directly communicate with each other via other techniques such as wired techniques, optical techniques, acoustic-based techniques, inductive communication, etc.

The consistent messaging can further include consistent and/or simultaneous updates to trip status on some or all of the interface devices included in the vehicle interface system. Thus, for example, if the autonomous vehicle arrives at its destination location and the trip status is changed from "on trip" to "arrived at destination", some or all of the interface devices included in the vehicle interface system can display or otherwise communicate a graphic or other message that communicates the updated trip status. In some implementations, trip status can also include information regarding the vehicle operational state, including, for example, information indicating whether various systems of the autonomous vehicle are operating correctly or are experiencing failure(s). Thus, the interface system can provide an accurate indication of trip status and vehicle operational state in real-time across all different interface device(s) included in the system.

In some implementations, the server computing system can communicate the change in trip status to the vehicle interface computing device(s) while, in other implementations, the autonomous vehicle can directly communicate the change in trip status to the vehicle interface computing device(s). For example, the autonomous vehicle can communicate with the vehicle interface computing device(s) via one or more wired and/or wireless communication connections, including, for example, short range wireless communication connections (e.g., Bluetooth).

In addition, responsive to a change in trip status, some or all of the vehicle interface computing devices included in the vehicle interface system can adjust (e.g., in response to received instructions or automatically) the respective sets of selectable vehicle commands provided by such devices. Thus, the vehicle interface computing devices can provide certain selectable vehicle commands (e.g., "pull over vehicle command") for a first trip status (e.g., "on trip") but, once the trip status changes, can automatically change (e.g., change the provided user interface) to provide one or more alternative and/or additional selectable vehicle commands (e.g., "unlock doors") based on the updated trip stats (e.g., "arrived at destination").

The systems and methods of the present disclosure provide a number of different technical effects and benefits. As one example technical effect and benefit, use of multiple, redundant interface computing devices eliminates the risk of a single point of failure, making the interface system resilient against failure of one of the vehicle interface computing devices. For example, in the event of a vehicle accident that results in damage to the in-vehicle display device and associated system or an inability of the passenger to reach/interact with the in-vehicle display device, the passenger may still be able to provide vehicle commands (e.g., a contact support command or exit roadway command), which may result in improved passenger safety and vehicle performance. In another example, vehicle system failures can be consistently communicated across the multiple interface device(s), including in situations where one or more of the interface device(s) (e.g., the in-vehicle display device) are not functional.

As another example technical effect and benefit, use of multiple, redundant interface computing devices can enable a passenger to provide vehicle commands using the interface device that is most convenient at any given moment. This can result in vehicle commands being entered more quickly by the passenger, since they can use the most convenient device and are not required to reach for and operate an inconvenient device. Faster entry of vehicle commands can result in more efficient and improved vehicle performance. As one example, in the event of an emergency, the passenger can provide a pull vehicle over command more quickly, resulting in the vehicle being pulled over sooner, potentially reducing the severity of the emergency and improving passenger safety and vehicle performance.

With reference now to the Figures, example embodiments of the present disclosure will be discussed in further detail.

Example Devices and Systems

Figure 1:
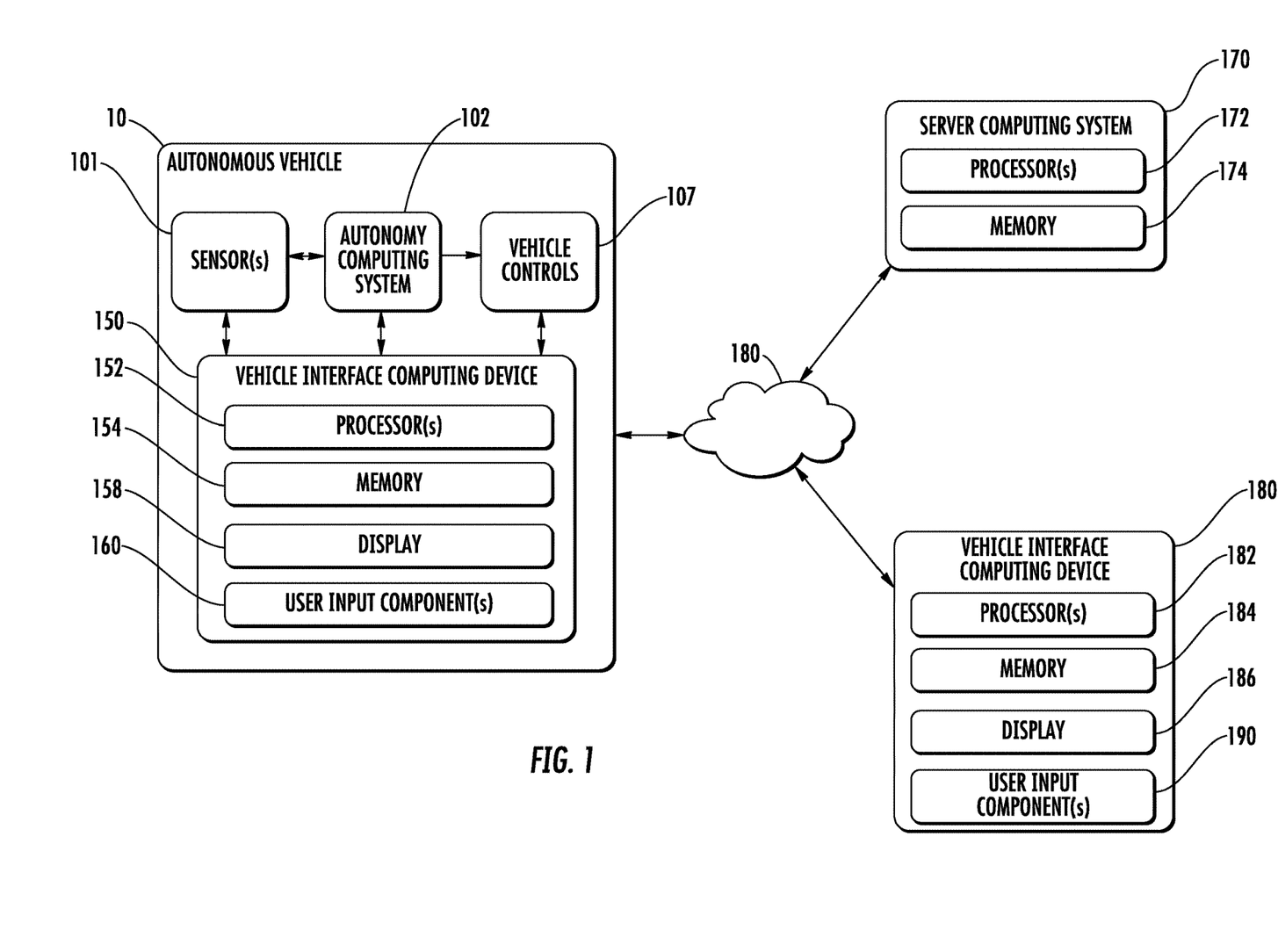
FIG. 1 depicts a block diagram of an example autonomous vehicle interface computing system according to example embodiments of the present disclosure.

FIG. 1 depicts a block diagram of an example computing system according to example embodiments of the present disclosure. The example computing system includes an autonomous vehicle 10, a server computing system 170, and a vehicle interface computing device 180 that are communicatively coupled over one or more communication networks 180. The autonomous vehicle 10 can include one or more sensors 101, an autonomy computing system 102, one or more vehicle controls 107, and a vehicle interface computing device 150. The sensors 101, autonomy computing system 102, and vehicle controls 107 will be discussed in further detail below with reference to FIG. 2.

The vehicle interface computing device 150 can enable communication, control, and/or other interface actions to occur between the autonomous vehicle 10 and a human (e.g., a passenger located within the autonomous vehicle 10). The vehicle interface computing device 150 can be communicatively coupled to the autonomy computing system 102 to enable exchange of data, instructions, and/or requests between the system 102 and the device 150.

The vehicle interface computing device 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage media, such as RAM, ROM, EEPROM, EPROM, one or more memory devices, flash memory devices, etc., and combinations thereof.

The memory 154 can store information that can be accessed by the one or more processors 152. For instance, the memory 154 (e.g., one or more non-transitory computer-readable storage mediums, memory devices) can store data that can be obtained, received, accessed, written, manipulated, created, and/or stored. The memory 154 can also store computer-readable instructions that can be executed by the one or more processors 152. The instructions can be software written in any suitable programming language or can be implemented in hardware. Additionally, or alternatively, the instructions can be executed in logically and/or virtually separate threads on processor(s) 152. For example, the memory 154 can store instructions that when executed by the one or more processors 152 cause the one or more processors 152 to perform any of the operations and/or functions described herein.

The vehicle interface computing device 150 can include or be implemented by one or more computing devices that are operatively connected. The vehicle interface computing device 150 can be an embedded computing device or a stand-alone computing device. In one particular example, the vehicle interface computing device 150 can be a tablet computing device that is positioned within the autonomous vehicle 10 (e.g., within a rear seat area of the autonomous vehicle 10).

Thus, in some implementations, the vehicle interface computing device 150 can be or include a computing device (e.g., a tablet computer, and/or the like) physically located onboard the autonomous vehicle. Such a computing device can include a display affixed to an interior element of the autonomous vehicle and viewable by the passenger when the passenger is located inside the autonomous vehicle. In some of such embodiments, the computing system can identify (e.g., based on the determined current state, and/or the like) the vehicle interface computing device 150 physically located onboard the autonomous vehicle 10 as being associated with the passenger (e.g., being presently viewable by the passenger, and/or the like). For example, the computing system can determine that the passenger is located inside the autonomous vehicle 10, and/or the like.

Responsive to identifying the vehicle interface computing device 150 physically located onboard the autonomous vehicle as being associated with the passenger, the computing system can: generate, for example in accordance with one or more parameters of the computing device (e.g., display size, input capabilities, operating system, and/or the like), data describing one or more interfaces, for example, based on a determined current trip state; and can communicate, to the vehicle interface computing device 150, the data describing the interface(s) (e.g., for display, and/or the like).

In particular, according to an aspect of the present disclosure, the vehicle interface computing device 150 can facilitate the selection and entry of vehicle commands by a human passenger. In particular, the vehicle interface computing device 150 can utilize one or more interactive user interfaces to enable passengers to select or otherwise enter vehicle commands.

Figure 3:
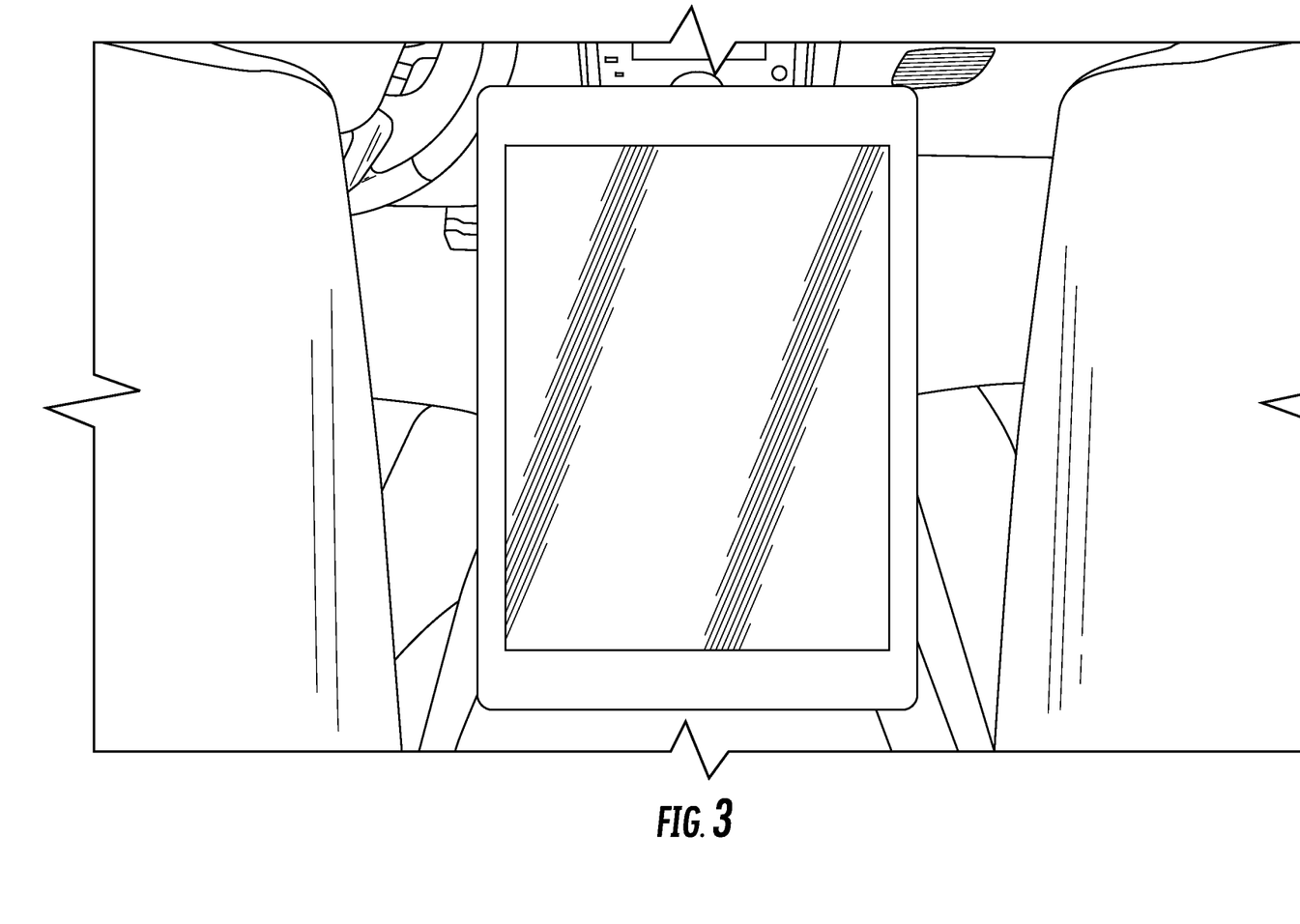
FIG. 3 depicts an example vehicle interface device according to example embodiments of the present disclosure.

In some implementations, the vehicle interface computing device 150 can include a display device 158 (e.g., a touch-sensitive display device) and/or other input/output components 160 that provide an interactive user interface (e.g., through which the passenger can provide passenger input). For example, the display device 158 can be a rear-seat display device that is accessible by a passenger that is located in a rear seat of the autonomous vehicle. As one example, FIG. 3 depicts an example rear-seat display device according to example embodiments of the present disclosure.

Referring again to FIG. 1, in some implementations, in addition or alternatively to the first vehicle interface computing device 150, the systems and methods of the present disclosure can include or leverage a second vehicle interface computing device 180. For example, the second vehicle interface computing device 180 can be portable, hand held, and/or associated with the passenger. For example, in some implementations, in addition or alternatively to the display of a user interface by the first vehicle interface computing device 150, an interactive user interface can be provided on or accessible via a display or other interactive components of the second vehicle interface computing device 180.

As examples, the second vehicle interface computing device 180 can be a smartphone, tablet computing device, wearable computing device, portable gaming device, hand-held display screen, or other forms of computing devices.

The vehicle interface computing device 180 can include one or more processors 182 and a memory 184. The one or more processors 182 can be any suitable processing device (e.g., a processor core, a microprocessor, an ASIC, a FPGA, a controller, a microcontroller, etc.) and can be one processor or a plurality of processors that are operatively connected. The memory 184 can include one or more non-transitory computer-readable storage media, such as RAM, ROM, EEPROM, EPROM, one or more memory devices, flash memory devices, etc., and combinations thereof.

The memory 184 can store information that can be accessed by the one or more processors 182. For instance, the memory 184 (e.g., one or more non-transitory computer-readable storage mediums, memory devices) can store data that can be obtained, received, accessed, written, manipulated, created, and/or stored. The memory 184 can also store computer-readable instructions that can be executed by the one or more processors 182. The instructions can be software written in any suitable programming language or can be implemented in hardware. Additionally, or alternatively, the instructions can be executed in logically and/or virtually separate threads on processor(s) 182. For example, the memory 184 can store instructions that when executed by the one or more processors 182 cause the one or more processors 182 to perform any of the operations and/or functions described herein.

In some implementations, the vehicle interface computing device 180 can include a display device 186 (e.g., a touch-sensitive display device) and/or other input/output components 190 that provide an interactive user interface (e.g., through which the passenger can provide passenger input).

Thus, in some implementations, the passenger can be in possession of the second vehicle interface computing device 180 (e.g., a mobile device, smartphone, and/or the like) distinct from the autonomous vehicle. The computing system can identify (e.g., based on the determined current state, and/or the like) the second vehicle interface computing device 180 as being associated with the passenger (e.g., being presently viewable by the passenger, and/or the like). For example, the computing system can determine (e.g., based on the determined current state, as part of determining the current state, and/or the like) that the passenger is in possession of the computing device 180 outside the autonomous vehicle 10, the passenger is in possession of the computing device 180 within a given proximity (e.g., a predetermined radius, and/or the like) of the autonomous vehicle 10, the passenger is in possession of the computing device 180 inside the autonomous vehicle 10, and/or the like.

In some implementations, responsive to identifying the second vehicle interface computing device 180 as being associated with the passenger, the computing system can: generate, for example in accordance with one or more parameters of the computing device 180 (e.g., display size, input capabilities, operating system, and/or the like), data describing one or more interfaces based on the determined current state; and can communicate, to the computing device 180, the data describing the interface(s) (e.g., for display, and/or the like).

In some implementations, the second vehicle interface computing device 180 can be communicatively connected to the first vehicle interface computing device 150 and/or the autonomous vehicle 10 via a local area network such as a short-range wireless connection (e.g., a Bluetooth, ZigBee, NFC, infrared, etc.) or other forms of connections (e.g., hardwiring).

In yet further implementations, certain operations described herein (e.g., operations such as generating and providing user interfaces for display) can be performed by a server computing system 170 that is remotely located to the autonomous vehicle 10 and in communication with the autonomous vehicle over one or more wireless networks 180 (e.g., cellular data networks, satellite communication networks, wide area networks, etc.).

As an example, the server computing system 170 can include one or more server computing devices. In the event that plural server computing devices are used, the server computing devices can be arranged according to a parallel computing architecture, a sequential computing architecture, or combinations thereof. In some implementations, the server computing system 170 can provide control, monitoring, management, and/or other functionality for a fleet of autonomous vehicles 10.

The server computing system 170 can include one or more processors 172 and a memory 174. The one or more processors 172 can be any suitable processing device (e.g., a processor core, a microprocessor, an ASIC, a FPGA, a controller, a microcontroller, etc.) and can be one processor or a plurality of processors that are operatively connected. The memory 174 can include one or more non-transitory computer-readable storage media, such as RAM, ROM, EEPROM, EPROM, one or more memory devices, flash memory devices, etc., and combinations thereof.

The memory 174 can store information that can be accessed by the one or more processors 172. For instance, the memory 174 (e.g., one or more non-transitory computer-readable storage mediums, memory devices) can store data that can be obtained, received, accessed, written, manipulated, created, and/or stored. The memory 174 can also store computer-readable instructions that can be executed by the one or more processors 172. The instructions can be software written in any suitable programming language or can be implemented in hardware. Additionally, or alternatively, the instructions can be executed in logically and/or virtually separate threads on processor(s) 172. For example, the memory 174 can store instructions that when executed by the one or more processors 172 cause the one or more processors 172 to perform any of the operations and/or functions described herein.

In some embodiments, the computing system (e.g., by way of operations performed or overseen by the server computing system 170) can establish a communication session between the first vehicle interface computing device 150 physically located onboard the autonomous vehicle 10 and the second vehicle interface computing device 180 in accordance with a short-range wireless-communication protocol (e.g., Bluetooth, ZigBee, near-field communication, and/or the like). In some of such embodiments, the computing system can: communicate at least one of the interface(s) for display to the second vehicle interface computing device 180 via the communication session; receive, from the second vehicle interface computing device 180 and via the communication session, data indicating that the passenger has invoked (e.g., via one or more of the interface(s), and/or the like) a function of the autonomous vehicle 10; and/or the like.

In some embodiments, the computing system can determine a current state of the trip based on establishment of the communication session, data communicated via the communication session, a strength of a signal associated with the communication session, and/or the like. In some embodiments, establishing the communication session can include: the computing system communicating, to the second vehicle interface computing device 180, an identifier associated with a signal being emitted by the first vehicle interface computing device 150 physically located onboard the autonomous vehicle 10 in accordance with the short-range wireless-communication protocol; the computing system communicating, to the first vehicle interface computing device 150, an identifier associated with a signal being emitted by the second vehicle interface computing device 180 in accordance with the short-range wireless-communication protocol; and/or the like.

In some implementations, an interactive user interface is not displayed on a display device (e.g., display 158), but instead may be, as one example, audio-based. For example, a speaker included in the first vehicle interface computing device 150 or the second device 180 or other system component may prompt the user to provide a voice response that includes passenger input that selects a vehicle command. In other instances, passenger input (e.g., selection of a vehicle command) can be provided by voice input without or in the absence of a particular prompt. For example, a personal assistant or other artificial intelligence-based technology can interact with the passenger via voice conversation to obtain input.

As another example, a user interface can be embodied in one or more physical buttons, knobs, sliders, levers, or other user input components 160 which enable a user to provide passenger input through manipulation of such physical components.

As yet another example, passenger input can be obtained through analysis of imagery captured by a camera. For example, computer vision techniques can be applied to imagery to assess or identify gestures, speech, eye movement, and/or facial expressions indicative of passenger comfort and/or satisfaction (e.g., thumbs up versus thumbs down).

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Figure 2:
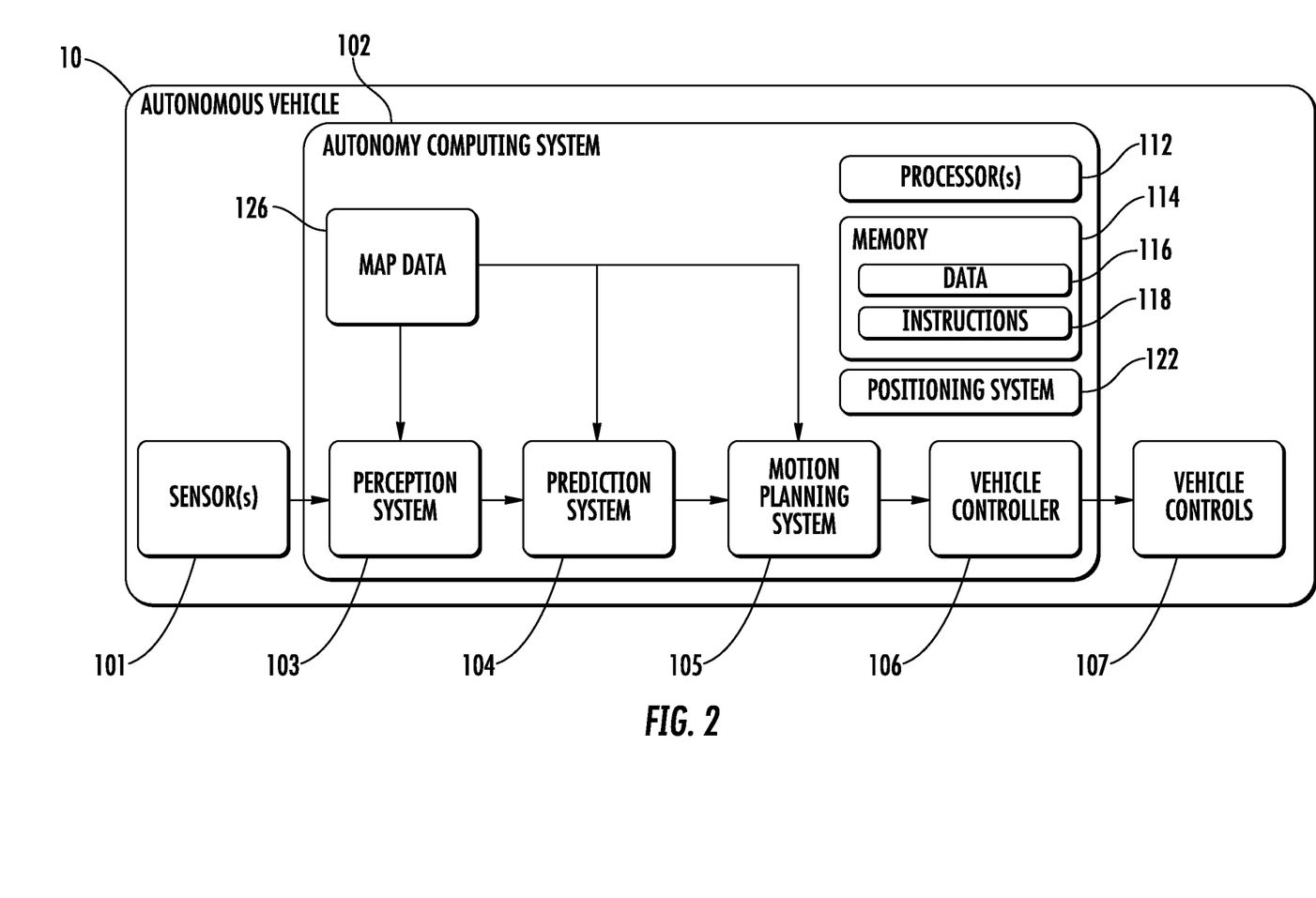
FIG. 2 depicts a block diagram of an example autonomous vehicle according to example embodiments of the present disclosure.

FIG. 2 depicts a block diagram of the example autonomous vehicle 10 in further detail according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 10 includes one or more sensors 101, the autonomy computing system 102, and one or more vehicle controls 107. The autonomy computing system 102 can assist in controlling the autonomous vehicle 10. In particular, the autonomy computing system 102 can receive sensor data from the one or more sensors 101, attempt to comprehend the surrounding environment by performing various processing techniques on data collected by the sensors 101, and generate an appropriate motion path through such surrounding environment. The autonomy computing system 102 can control the one or more vehicle controls 107 to operate the autonomous vehicle 10 according to the motion path.

The autonomy computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein.

In some implementations, autonomy computing system 102 can further include a positioning system 122. The positioning system 122 can determine a current position of the vehicle 10. The positioning system 122 can be any device or circuitry for analyzing the position of the vehicle 10. For example, the positioning system 122 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the autonomy computing system 102.

As illustrated in FIG. 2, the autonomy computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

As one example, in some implementations, the motion planning system 105 can evaluate a cost function for each of one or more candidate motion plans for the autonomous vehicle 10 based at least in part on the current locations and/or predicted future locations of the objects. For example, the cost function can provide a cost (e.g., over time) of adhering to a particular candidate motion plan. For example, the cost provided by a cost function can increase when the autonomous vehicle 10 strikes another object and/or deviates from a preferred pathway (e.g., a preapproved pathway).

Thus, given information about the current locations and/or predicted future locations of objects, the motion planning system 105 can determine a cost of adhering to a particular candidate pathway. The motion planning system 105 can select or determine a motion plan for the autonomous vehicle 10 based at least in part on the cost function(s). For example, the motion plan that minimizes the cost function can be selected or otherwise determined. The motion planning system 105 can provide the selected motion plan to a vehicle controller 106 that controls one or more vehicle controls 107 (e.g., actuators or other devices that control gas flow, steering, braking, etc.) to execute the selected motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Example Methods

Figure 4:
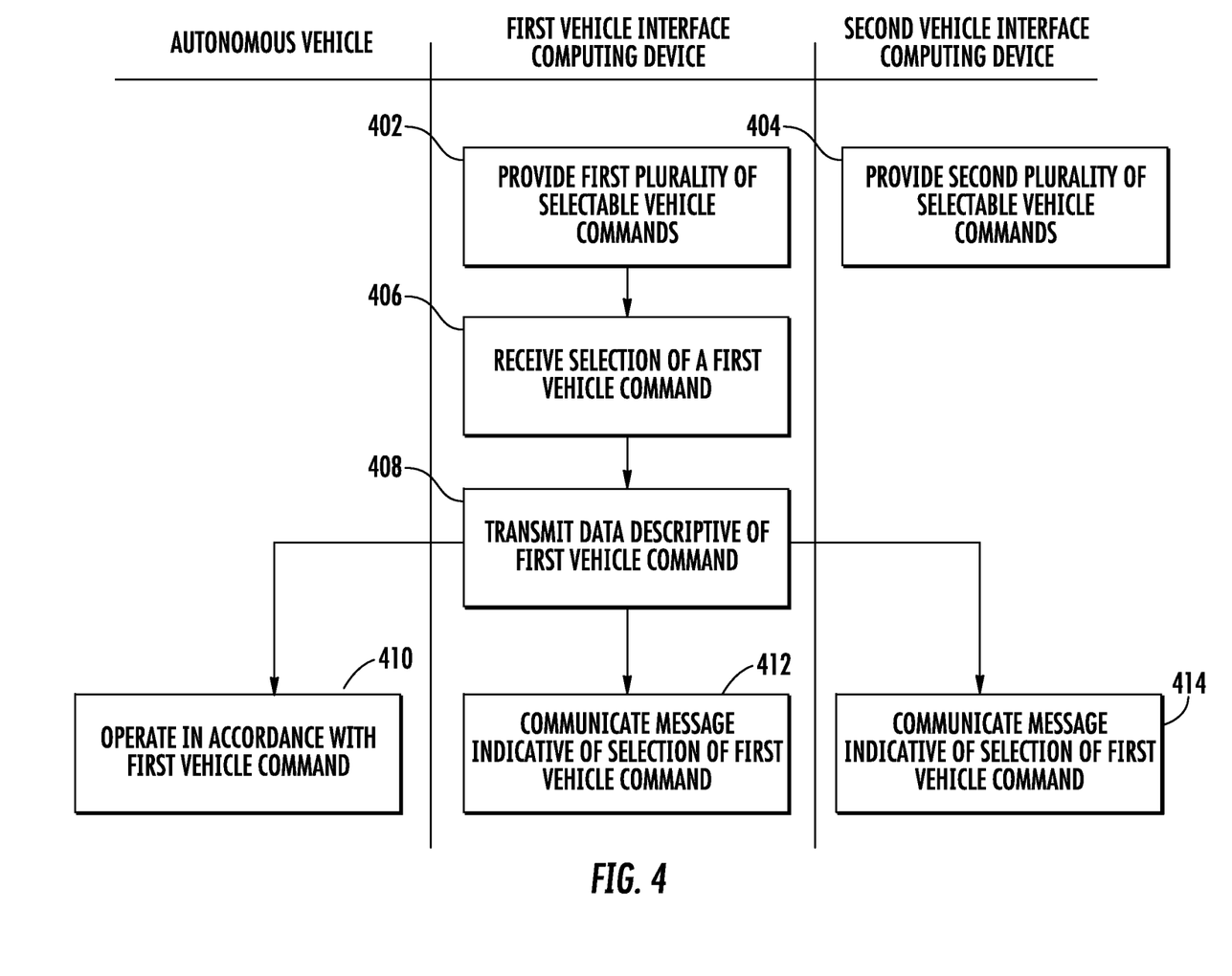
FIG. 4 depicts a swim lane diagram of an example method to enable interaction between a human passenger and an autonomous vehicle according to example embodiments of the present disclosure.

FIG. 4 depicts a swim lane diagram of an example method to enable interaction between a human passenger and an autonomous vehicle according to example embodiments of the present disclosure.

At 402, a first vehicle interface computing device provides a first plurality of selectable vehicle commands. For example, the first vehicle interface computing device can provide the first plurality of selectable vehicle commands as selectable icons, buttons, etc. within an interactive user interface that is displayed on a display screen.

At around a same time as 402, at 404, a second vehicle interface computing device provides a second plurality of selectable vehicle commands. For example, the second vehicle interface computing device can provide the second plurality of selectable vehicle commands as selectable icons, buttons, etc. within an interactive user interface that is displayed on a display screen. In particular, according to an aspect of the present disclosure, the second plurality of selectable vehicle commands can include at least some of the same commands as the first plurality of selectable vehicle commands.

At 406, the first vehicle interface computing device receives selection of a first vehicle command. At 408, the first vehicle interface computing device transmits data descriptive of the first vehicle command to the autonomous vehicle and the second vehicle interface computing device.

At 410, the autonomous vehicle operates in accordance with the first vehicle command. At about a same time as 410, at 412, the first vehicle interface computing device communicates a message (e.g., by displaying some message or graphic within the user interface) that is indicative of selection of the first vehicle command. Likewise, at about a same time as 412, at 414, the second vehicle interface computing device communicates a message (e.g., by displaying some message or graphic within the user interface) that is indicative of selection of the first vehicle command.

In the swim lane diagram of FIG. 4, the respective operations performed by the first and second vehicle interface computing devices can be switched.

Figure 5:
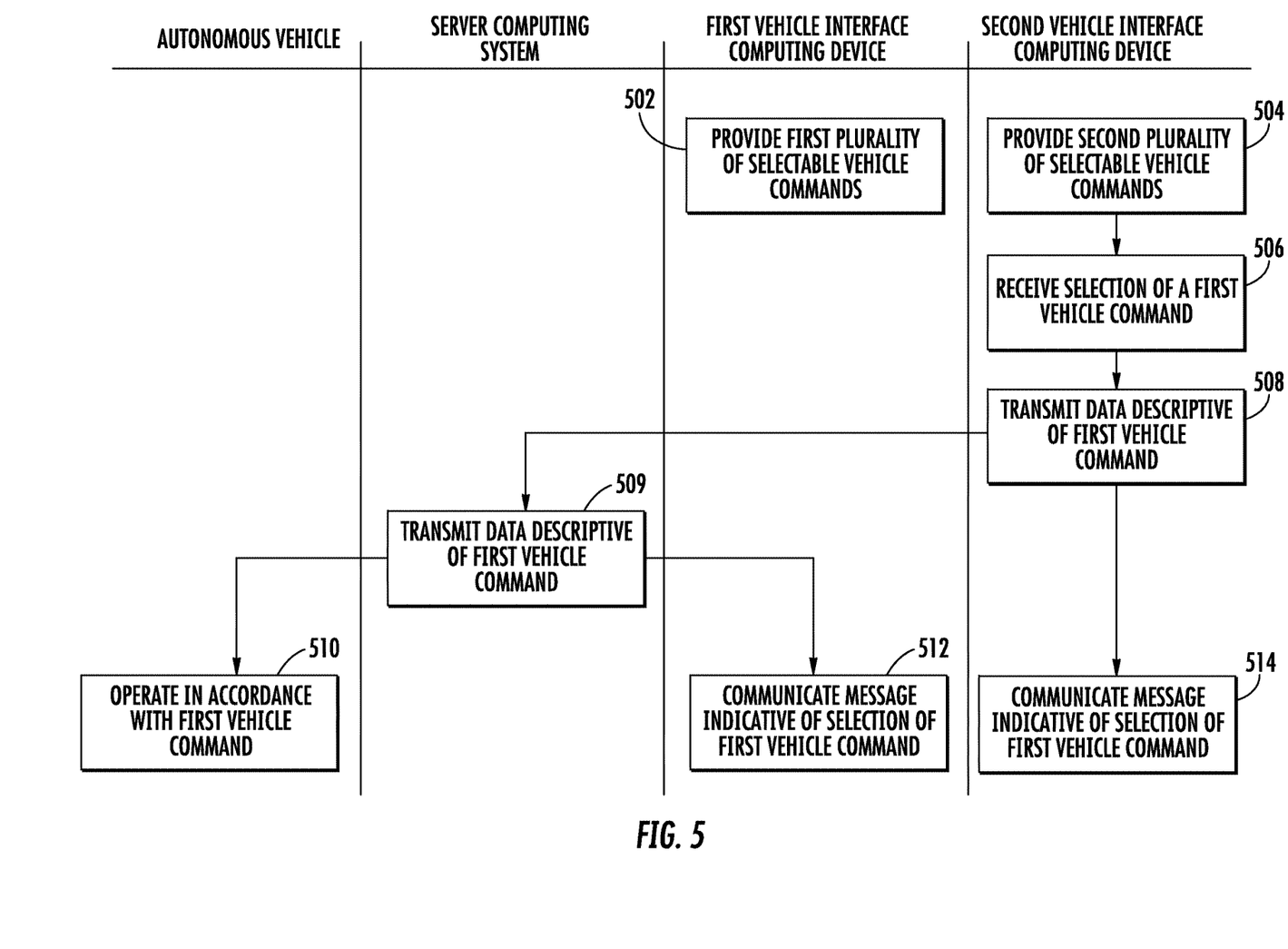
FIG. 5 depicts a swim lane diagram of an example method to enable interaction between a human passenger and an autonomous vehicle according to example embodiments of the present disclosure.

FIG. 5 depicts a swim lane diagram of an example method to enable interaction between a human passenger and an autonomous vehicle according to example embodiments of the present disclosure.

At 502, a first vehicle interface computing device provides a first plurality of selectable vehicle commands. For example, the first vehicle interface computing device can provide the first plurality of selectable vehicle commands as selectable icons, buttons, etc. within an interactive user interface that is displayed on a display screen.

At around a same time as 502, at 504, a second vehicle interface computing device provides a second plurality of selectable vehicle commands. For example, the second vehicle interface computing device can provide the second plurality of selectable vehicle commands as selectable icons, buttons, etc. within an interactive user interface that is displayed on a display screen. In particular, according to an aspect of the present disclosure, the second plurality of selectable vehicle commands can include at least some of the same commands as the first plurality of selectable vehicle commands.

At 506, the second vehicle interface computing device receives selection of a first vehicle command. At 508, the first vehicle interface computing device transmits data descriptive of the first vehicle command to a server computing system. At 509, the server computing system transmits data descriptive of the first vehicle command to an autonomous vehicle and the first vehicle interface computing device.

At 510, the autonomous vehicle operates in accordance with the first vehicle command. At about a same time as 510, at 512, the first vehicle interface computing device communicates a message (e.g., by displaying some message or graphic within the user interface) that is indicative of selection of the first vehicle command. Likewise, at about a same time as 512, at 514, the second vehicle interface computing device communicates a message (e.g., by displaying some message or graphic within the user interface) that is indicative of selection of the first vehicle command.

In the swim lane diagram of FIG. 5, the respective operations performed by the first and second vehicle interface computing devices can be switched.

Figure 6:
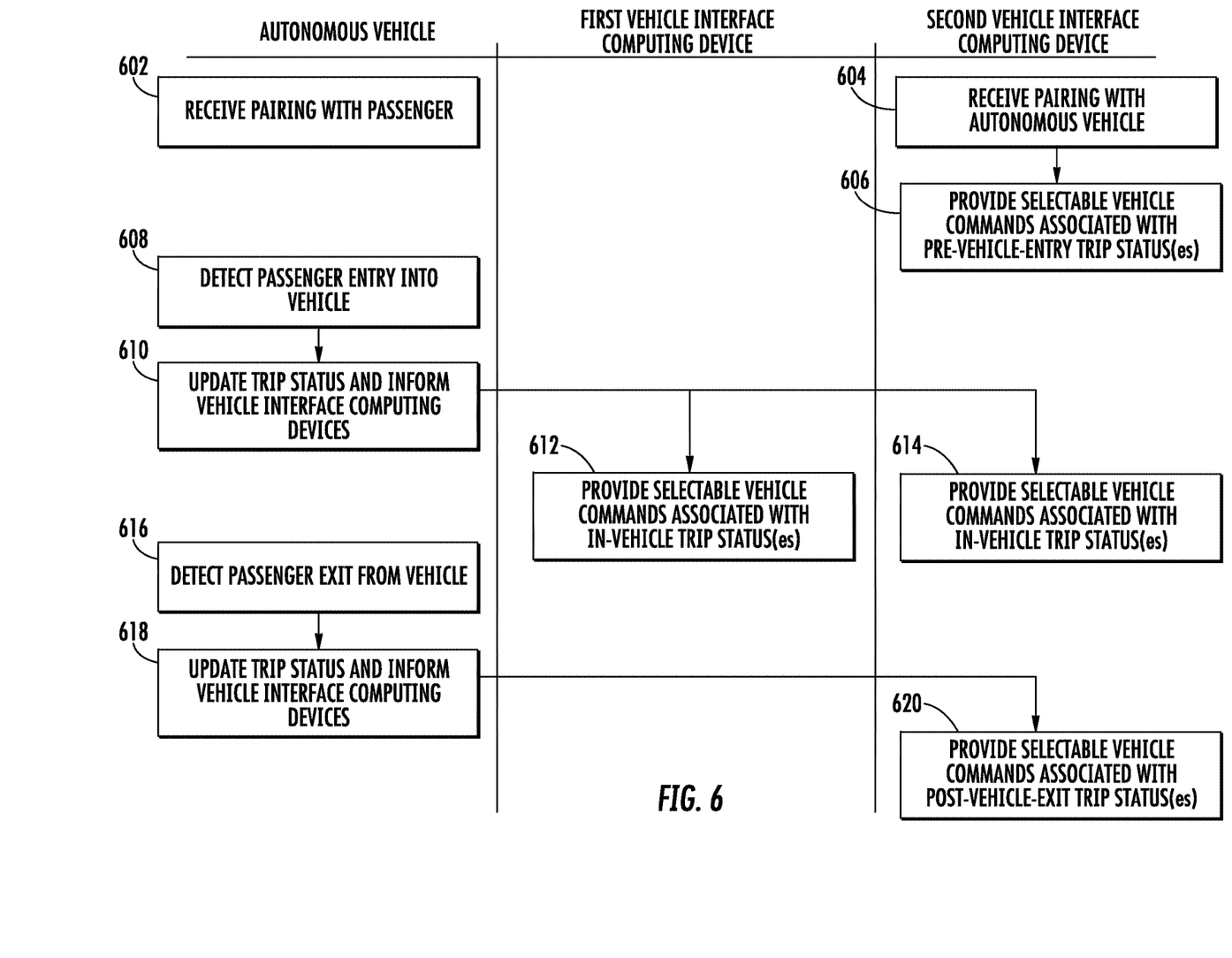
FIG. 6 depicts a swim lane diagram of an example method to enable interaction between a human passenger and an autonomous vehicle according to example embodiments of the present disclosure.

FIG. 6 depicts a swim lane diagram of an example method to enable interaction between a human passenger and an autonomous vehicle according to example embodiments of the present disclosure.

At 602, an autonomous vehicle receives a pairing with a passenger. At about a same time as 602, at 604, a second vehicle interface computing device receives a pairing with the autonomous vehicle.

At 606, the second vehicle interface computing device provides selectable vehicle commands associated with pre-vehicle-entry trip status(es).

At 608, the autonomous vehicle detects passenger entry into the vehicle. For example, sensors such as camera, door sensors, heat sensors, seat pressure sensors, seat belt sensors, etc. can be used to detect passenger entry into the vehicle. As another example, passenger entry can be detected and communicated by the first vehicle interface computing device based on passenger interaction with the first vehicle interface computing device (this example not shown).

At 610, the autonomous vehicle updates the trip status and informs the first and the second vehicle interface computing devices. In some implementations, this communication at 610 can be facilitated or intermediated by a server computing system.

At 612, the first vehicle interface computing device provides selectable vehicle commands associated with in-vehicle trip status(es). At about a same time as 612, at 614, the second vehicle interface computing device provides selectable vehicle commands associated with in-vehicle trip status(es). For example, at 612 and 614, the first and the second vehicle interface computing devices can each provide one or more of the same selectable vehicle commands.

At 616, the autonomous vehicle detects passenger exit from the vehicle. For example, sensors such as camera, door sensors, heat sensors, seat pressure sensors, seat belt sensors, etc. can be used to detect passenger exit from the vehicle.

At 618, the autonomous vehicle updates the trip status and informs at least the second vehicle interface computing device (the first vehicle interface computing device can also be informed but such is not shown in the Figure). In some implementations, this communication at 618 can be facilitated or intermediated by a server computing system.

At 620, the second vehicle interface computing device provides selectable vehicle commands associated with post-vehicle-exit trip status(es).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for enabling interaction between a human passenger and an autonomous vehicle, the computing system configured to:
    receive data indicating that the human passenger selected a first vehicle command at a first vehicle interface computing device located within the autonomous vehicle and physically coupled to the autonomous vehicle, wherein the first vehicle interface computing device provides a first plurality of selectable vehicle commands to the human passenger, wherein at least some of the plurality of selectable vehicle commands are also included in a second plurality of selectable vehicle commands that are provided by a second vehicle interface computing device that is portable; and
    in response to receipt of the data, causing the second vehicle interface computing device to communicate a message that indicates that the first vehicle command was selected, wherein the message causes the second vehicle interface computing device to display a graphic that indicates that the first vehicle command was selected.

2. The computing system of claim 1, wherein both the first plurality of selectable vehicle commands and the second plurality of selectable vehicle commands comprise one or more of:
    a start trip command;
    a request vehicle pull over command;
    a contact support command;
    a route selection command; or
    a cabin condition command.

3. The computing system of claim 1, wherein the first vehicle interface computing device comprises a tablet computing device.

4. The computing system of claim 1, further comprising:
    the second vehicle interface computing device.

5. The computing system of claim 4, wherein the second vehicle interface computing device comprises a user computing device associated with the human passenger and through which the human passenger requested a trip with the autonomous vehicle.

6. The computing system of claim 4, wherein the second vehicle interface computing device provides at least some of the second plurality of selectable vehicle commands for selection by the human passenger at least one of: prior to entry into the autonomous vehicle by the human passenger or subsequent to exit of the autonomous vehicle by the human passenger.

7. The computing system of claim 1, further comprising:
    one or more hardware components located within the autonomous vehicle and physically coupled to the autonomous vehicle, wherein the one or more hardware components enable entry by the human passenger of one or more of the first plurality of selectable vehicle commands.

8. The computing system of claim 1, wherein the computing system is connected to the autonomous vehicle, the first vehicle interface computing device, and the second vehicle interface computing device over a wide area network.

9. The computing system of claim 8, wherein the computing system is configured to resolve conflicting commands respectively received from the first vehicle interface computing device and the second vehicle interface computing device based on respective times of receipt for the conflicting commands at the computing system.

10. The computing system of claim 8, wherein the computing system is configured to:
    receive data indicating that a trip status associated with the autonomous vehicle has changed; and
    in response to receipt of the data, cause the first vehicle interface computing device and the second vehicle interface computing device to display respective graphics that indicate that the trip status has changed.

11. The computing system of claim 8, wherein the computing system is configured to:
receive data indicating that a trip status associated with the autonomous vehicle has changed; and
in response to receipt of the data, cause the first vehicle interface computing device and the second vehicle interface computing device to respectively change the first plurality of selectable vehicle commands and the second plurality of selectable vehicle commands to include at least one new selectable vehicle command.

12. A computer-implemented method comprising:
receiving data indicating that a human passenger selected a first vehicle command at a first vehicle interface computing device, wherein the first vehicle command was redundantly provided for selection on both the first vehicle interface computing device and a second vehicle interface computing device, and wherein both the first vehicle interface computing device and the second vehicle interface computing device are physically located within an autonomous vehicle; and
in response to receipt of the data causing the second vehicle interface computing device to communicate a message that indicates that the first vehicle command was selected, wherein the message causes the second vehicle interface computing system to display a graphic that indicates that the first vehicle command was selected.

13. The computer-implemented method of claim 12, further comprising, prior to receiving the data indicating that the human passenger selected the first vehicle interface computing device:
providing instructions to cause the first vehicle interface computing device to provide an interface that includes a plurality of selectable vehicle commands, the plurality of selectable vehicle commands comprising the first vehicle command.

14. The computer-implemented method of claim 12, further comprising:
causing the autonomous vehicle to operate according to the first vehicle command.

15. The computer-implemented method of claim 12, wherein:
the first vehicle interface computing device comprises a display device physically coupled to the autonomous vehicle; and
the second vehicle interface computing device comprises a hand held user computing device.

16. The computer-implemented method of claim 12, wherein:
the first vehicle interface computing device comprises a hand held user computing device; and
the second vehicle interface computing device comprises a display device physically coupled to the autonomous vehicle.

17. A server computing system connected to an autonomous vehicle comprising an in-vehicle interface computing device located in a cabin of the autonomous vehicle and physically coupled to the autonomous vehicle, and a hand held user computing device over a wide area network, wherein the server computing system is configured to:
receive data indicating that a passenger selected one of a first plurality of selectable vehicle commands at the hand held user computing device; and
in response to receipt of the data, communicate a message to the in-vehicle interface computing device that indicates that the first vehicle command was selected, wherein the message causes the in-vehicle interface computing device to display a graphic that indicates that the first vehicle command was selected.

18. The server computing system of claim 17, wherein the first vehicle command comprises:
a start trip command; or
a request vehicle pull over command.

19. The server computing system of claim 17, wherein the in-vehicle interface computing device is configured to provide the first plurality of selectable vehicle commands on a graphical interface.

20. The server computing system of claim 17, wherein the autonomous vehicle is configured to control its motion responsive to selection of the first vehicle command at the hand held user computing device.

* * * * *